US006553269B1

(12) United States Patent
Hikita

(10) Patent No.: US 6,553,269 B1
(45) Date of Patent: Apr. 22, 2003

(54) DEVICE FOR MANAGING AND CONTROLLING OPERATION OF ELEVATOR

(75) Inventor: Shiro Hikita, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/297,747

(22) PCT Filed: Oct. 7, 1997

(86) PCT No.: PCT/JP97/03570

§ 371 (c)(1), (2), (4) Date: Aug. 11, 1999

(87) PCT Pub. No.: WO99/18025

PCT Pub. Date: Apr. 15, 1999

(51) Int. Cl.[7] .......................... G05B 13/02; B66B 1/00

(52) U.S. Cl. .......................... 700/48; 700/90; 187/247; 187/392

(58) Field of Search .......................... 340/933, 938; 187/247, 383, 382, 391, 392; 701/117, 118; 700/9, 28, 47, 48, 228, 229, 99, 100, 90

(56) References Cited

U.S. PATENT DOCUMENTS 4,802,082 A * 1/1989 Uetani .......................... 700/9
5,250,766 A * 10/1993 Hikita et al. ................ 187/247
5,306,878 A * 4/1994 Kubo .......................... 187/380
5,354,957 A * 10/1994 Robertson .................... 187/247
5,459,665 A 10/1995 Hikiki et al. ................ 701/118
5,544,059 A * 8/1996 Hikita et al. ................ 701/117
5,781,432 A * 7/1998 Keeler et al. ................ 700/44

FOREIGN PATENT DOCUMENTS

JP 6-329352 * 11/1994

* cited by examiner

*Primary Examiner*—John Follansbee
*Assistant Examiner*—Paul Rodriguez
(74) *Attorney, Agent, or Firm*—Leydig, Voit & Mayer, Ltd.

(57) ABSTRACT

An elevator operation management and control system includes a traffic data collecting section for collecting traffic data for finding a traffic amount, a traffic amount calculating section for calculating the traffic amount based on the traffic data collected by the traffic data collecting section, a traffic flow calculating section for calculating an estimated traffic flow of the elevator users moving between floors based on the traffic amount calculated by the traffic amount calculating section, a control parameter setting section for setting control parameters for controlling operations of the elevators based on the estimated traffic flow calculated by the traffic flow calculating section and an operation control section for controlling the operations of the elevators based on the control parameters set by the control parameter setting section, eliminating the need for preparing and storing combinations of a large number of traffic flow patterns and traffic amounts obtained from the traffic flow patterns in advance.

9 Claims, 7 Drawing Sheets

DEVICE FOR MANAGING AND CONTROLLING OPERATION OF ELEVATOR

TECHNICAL FIELD

The present invention relates to an elevator operation management and control system.

BACKGROUND ART

FIG. 7 is an explanatory diagram showing the basic concept for estimating a traffic flow of a prior art traffic control system described in JP-A-7-309546 (corresponding to U.S. Pat. No. 5,459,665) when the object controlled is a plurality of elevators.

In FIG. 7, reference numeral 11 denotes traffic amount data which is composed of quantitative information, such as number of persons who get into an elevator and number of persons who get off the elevator at each floor, 13 denotes a traffic flow indicative of the generation and movement of elevator users, including elements such as number of passengers, time period, elevator direction, and the like, and 12 denotes a multi-layered neural network (controlling neural network) for estimating the traffic flow 13 from the traffic amount data 11 based on a relationship between a preset traffic amount and a traffic flow pattern.

When the number of elevator users who get in at the i-th floor and get off at the j-th floor within a predetermined time period in a particular building, i.e., a number of elevator users who move from the i-th floor to the j-th floor, is assumed to be TFij, the traffic flow within the building in that time period may be expressed as follows:

$$\text{Traffic Flow: } TF=(TF\mathbf{12}, TF\mathbf{13}, \ldots, \text{TFij}, \ldots) \tag{1}$$

Then, traffic amount data, which is generated by that traffic flow and is observable, may be expressed as follows:

$$\text{Traffic Amount Data: } G=(p, q) \tag{2}$$

where, p is a number of persons who get into the elevator and q is a number of persons who get off the elevator at each floor.

Thus, the traffic flow is the actual flow of traffic and the traffic amount is a readily observable amount which can be found from the traffic flow.

Further, when an observable control result is set as E, the control result E may be expressed as follows:

$$\text{Control Result: } E=(r, y, m) \tag{3}$$

where, r is a distribution of response times to hall calls, y is a distribution of the number of times of prediction miss of each floor, and m is a distribution of the number of times when a car is full and passes a floor.

Because it is difficult to find the traffic flow TF accurately and directly from the traffic amount data G, which includes no information on moving directions of elevator users in a target time period, the traffic flow is found by an approximation.

At first, a large number of traffic flow patterns assumed for a building are prepared and the traffic amount data G and the control result E are generated for each traffic flow pattern, and control parameters are determined by simulation. Thereby, several relationships between "traffic amount data and traffic flow patterns" and between "traffic flow patterns and control results" are obtained.

Next, the relationship of the "traffic amount data and traffic flow pattern" is expressed in a neural network. The multi-layered neural network 12 as shown in FIG. 7 is prepared and the traffic amount data 11 is supplied to the input side. The traffic flow data 13, which has generated the traffic amount data 11, is supplied to the output side as teacher data so the neural network learns the relationship between the input and output.

As a result, when certain traffic amount data is input, the neural network 12 outputs a traffic flow pattern most resembling a traffic flow pattern that generates the input traffic amount data from the traffic flow patterns prepared in advance.

Accordingly, by teaching the neural network 12 enough traffic flow patterns, the neural network 12 can select and output a traffic flow pattern generating any arbitrary traffic amount data, or at least a traffic flow pattern very close to that traffic amount data, from the relationships of "traffic amount data and traffic flow pattern" learned so far.

When the same traffic amount data is generated from a plurality of different traffic flow patterns, the neural network 12 can select a traffic flow pattern which allows a specific control result to be obtained from the traffic flow patterns generating the same traffic amount data, utilizing the relationship between "traffic flow pattern and control result". The control results differ from each other, depending upon a fixed control parameter, when the traffic flows are different.

Further, the neural network 12 can set the optimum control parameter when it is possible to estimate the traffic flow data from the traffic amount data because it is possible to set a control parameter which produces the optimum control result by simulation and the like, for the traffic flow pattern prepared in advance.

The precision of the traffic flow estimation depends on the number of combinations between traffic flow patterns and traffic amount data obtained from the traffic flow patterns prepared in advance. However, it is not practical to prepare and store in advance combinations of all kinds of traffic flow patterns and traffic amount data obtained from the traffic flow patterns because an enormous amount of memory capacity is required. Further, this prior art technology cannot allot an appropriate car efficiently with respect to a particular elevator hall call and elevator user to be served.

In addition, the technology described in JP-B-62-36954 cannot allot an appropriate car efficiently because it cannot estimate what kind of traffic flow is occurring at the current point of time in real-time, while managing the elevator operation, although it can analyze what kind of traffic flow has occurred in the past.

SUMMARY OF THE INVENTION

Accordingly, it is an object of the present invention to solve such problems by providing an elevator operation management and control system which can estimate traffic flow from observed traffic amount data in real-time and can manage and control elevator operation corresponding to the estimated traffic flow.

The present invention provides an elevator operation management and control system for managing the control of at least one elevator. The system includes a traffic data collecting section that collects traffic data regarding users of the elevator; a traffic amount calculating section, responsive to the traffic data collecting section, that calculates traffic amount data for the elevator; a traffic flow estimating section, responsive to the traffic amount calculating section, that calculates an estimated traffic flow of elevator users who move between respective floors of the elevator, based on the traffic amount data, and including a neural network having an input side to which the traffic amount data is supplied and an output side at which the estimated traffic flow was obtained; a control parameter setting section that sets control parameters for controlling operation of the elevator, based on the estimated traffic flow calculated by the traffic flow calculating section and the traffic amount data; an operation control section that controls operation of the elevator based on the control parameters set by the control parameter setting section; a teacher data creating section for creating teacher data for learning by the neural network, based on the traffic data collected by the traffic data collecting section; and an estimating function constructing section, responsive to the teacher data creating section and connected to the traffic flow estimating section, for constructing a function for calculating the estimated traffic flow, supplied to the traffic flow estimating section, by the learning of the neural network, based upon the teacher data created by the teacher data creating section.

BEST MODE FOR CARRYING OUT THE INVENTION

An embodiment of the present invention will be explained using the drawings.

Figure 1:
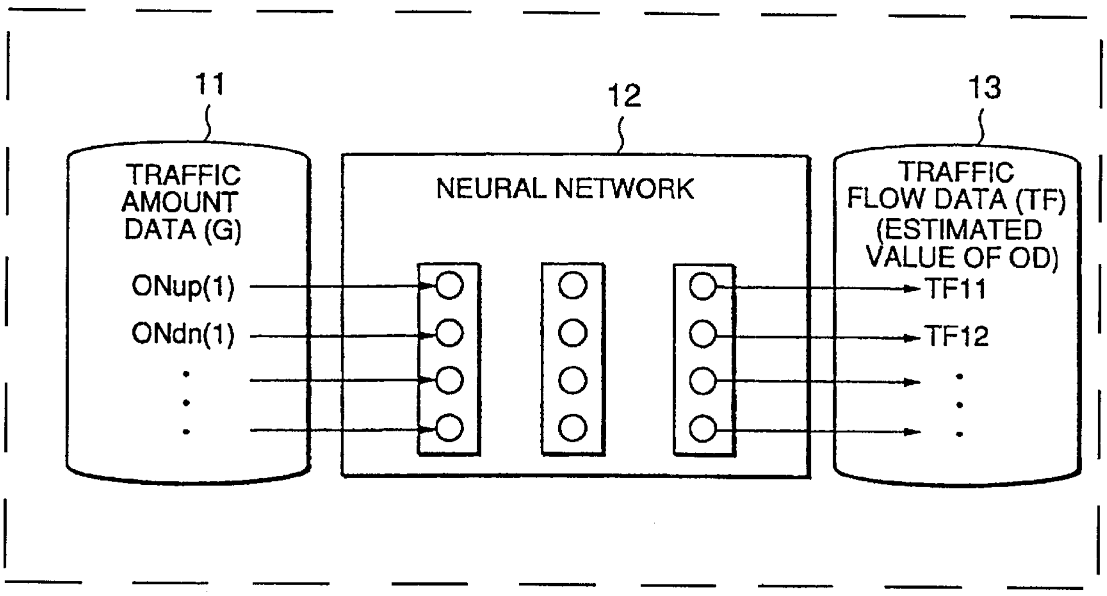
FIG. 1 is a schematic diagram of an elevator operation management and control system according to the present invention.

FIG. 1 is a schematic diagram showing the basic concept of traffic flow estimation of an elevator operation management and control system according to the present invention. The concept will be explained here by application to operation of a plurality of elevators by group management control.

In FIG. 1, traffic amount data 11 includes quantitative information, such as number of persons getting in and number of persons getting off elevators, per each direction, (UP/DOWN) at each floor and traffic flow data 13 is described by OD (Origin/Destination) data indicative of the traffic of elevator users moving between target inter-floors, i.e., from a certain floor to another floor, accounting for all of the traffic. A multi-layered neural network (controlling neural network) 12 estimates the traffic flow data 13 from the input traffic amount data 11.

When the number of elevator users who get in at the i-th floor and get off at the j-th floor within a predetermined time period in a certain building, i.e., the OD data indicative of number of elevator users who move from the i-th floor to the j-th floor, is assumed to be TFij, the traffic flow within the building may be expressed in the same manner as the prior art example described before because it is an integration of those OD data:

$$\text{Traffic Flow: } TF=(,TF12,\ TF13\ \ldots,\ TFij,\ \ldots) \tag{4}$$

Further, the traffic amount data which is generated by such traffic flow data and is observable may be expressed as follows:

Traffic Amount Data: $G$=(ON up($fl$), ON dn($fl$), OFF up($fl$), OFF dn($fl$))

ON up($fl$): number of persons getting in UP direction at fl-th floor,

ON dn($fl$): number of persons getting in DOWN direction at fl-th floor,

OFF up($fl$): number of persons getting off in UP direction at fl-th floor,

OFF dn($fl$): number of persons getting off in DOWN direction at fl-th floor (5)

Although it is usually possible to find the traffic amount data G shown in the expression (5) from the traffic flow data TF containing information indicative of the moving direction of the elevator users and of the target time period shown in the expression (4), it is difficult to find accurate traffic flow data TF from the traffic amount data G, conversely.

Then, according to the present invention, the traffic amount data G, which is a number of inter-floor elevator users of each floor, is found by the neural network from a past tabulation of the traffic flow data (OD data), i.e., how many elevator users move from which floor to which floor in a target time period. Besides the daily group management and control and a map, the traffic amount data is defined from the traffic flow data and expressed by the neural network. Then, the traffic amount data G is found approximately from the traffic flow data TF by inverse mapping, utilizing a learning result of the neural network in the group management of elevators.

Accordingly, the neural network is caused to learn the relationship between the traffic flow data TF and the traffic amount data G calculated after ending of daily control, for example. When the traffic amount data is given from the input side, the neural network learns the traffic flow data which is taken from the output side. As a general characteristic, the neural network can output traffic flow data corresponding to the traffic amount data when certain traffic amount data is input. That is, the neural network can develop an ability for inverse mapping as against mapping the traffic flow data amount from the traffic amount data.

While the operation control system provides group management control by setting control parameters corresponding to the traffic flow when the traffic flow can be specified, there are a variety of control parameters in the elevator group management control, such as a number of cars distributed to a congested floor, setting of out-of-service floors, prediction of arrival time of each car at a specified floor, weight of each evaluation index in call allotting, and the like.

However, when the traffic flow can be specified, the control result under the defined control parameters can be evaluated by means of simulation or the like and the optimum control parameters for each traffic flow may be set. That is, when the traffic flow can be estimated, the optimum control parameters may be set automatically.

Next, as an embodiment of the present invention, an elevator operation management and control system for controlling a plurality of elevator groups based on the traffic flow data estimated using the basic concept described above is explained by using FIG. 2.

Figure 2:
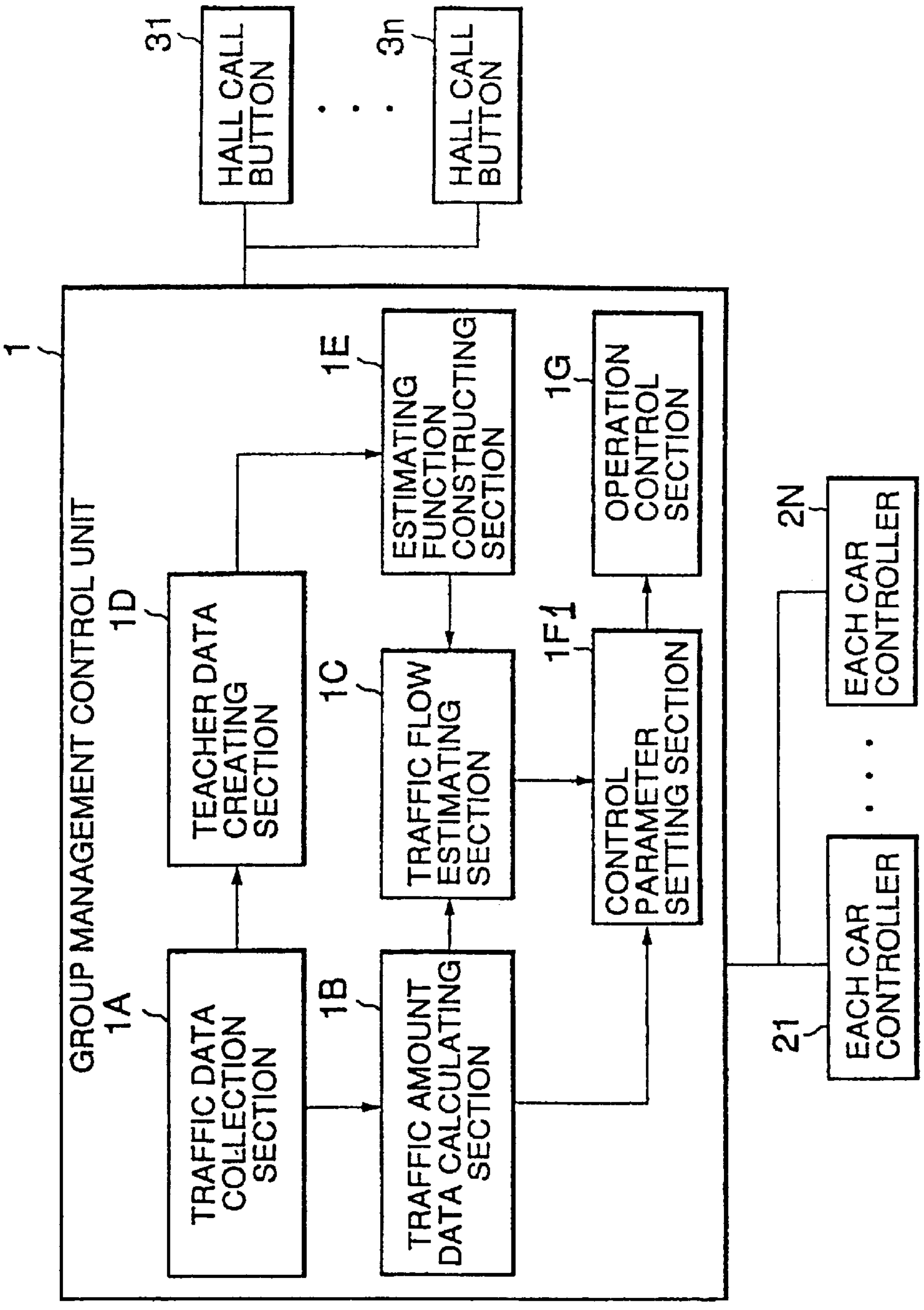
FIG. 2 is a block diagram of an elevator operation management and control system according to the present invention.

FIG. 2 is a block diagram showing the structure of a group management and control system as an example of the inventive elevator operation management and control system. In FIG. 2, the reference numerals 31 through 3N denote hall call buttons provided at respective floors. When an elevator user manipulates any one of the hall call buttons 31 through 3N, a hall call is output from the manipulated hall call button to the group management control unit 1 so that the group management control unit 1 implements group management control.

Each of car controllers 21 through 2N controls operation of each elevator, such as running, stopping, and opening/closing a door, based on control commands of the group management control unit 1.

Here, the group management control unit 1 comprises a traffic data collecting section 1A for collecting traffic data such as behavior of each elevator and generated calls, a traffic amount calculating section 1B for calculating a traffic amount from the collected traffic data, a traffic flow estimating section 1C as a traffic flow calculating section, for calculating a traffic flow estimated value from the calculated traffic amount data in real-time, a teacher data creating section 1D for creating teacher data for learning by the neural network by analyzing the movement of the elevator users from the traffic data, an estimating function constructing section 1E for constructing the function of the traffic flow estimating section 1C for calculating the traffic flow estimated value by learning of the neural network based on the teacher data created by the teacher data creating section 1D, a control parameter setting section 1F1 for setting control parameters for controlling the elevator groups based on the traffic flow estimated value estimated by the traffic flow estimating section 1C, and an operation control section 1G for controlling the group management based on the preset control parameters.

Here, the traffic data includes not only data for calculating the traffic amount, but also data for analyzing the movement of the elevator users to estimate the traffic flow, such as calls made by the elevator users, elevator operational information such as stops, up, down, and the like, number of persons who get in/get off the elevators, information on cars such as change in load, and target time period.

Next, a specific operation of the elevator group management control will be explained as the operation of the present embodiment by referring to FIG. 3.

Figure 3:
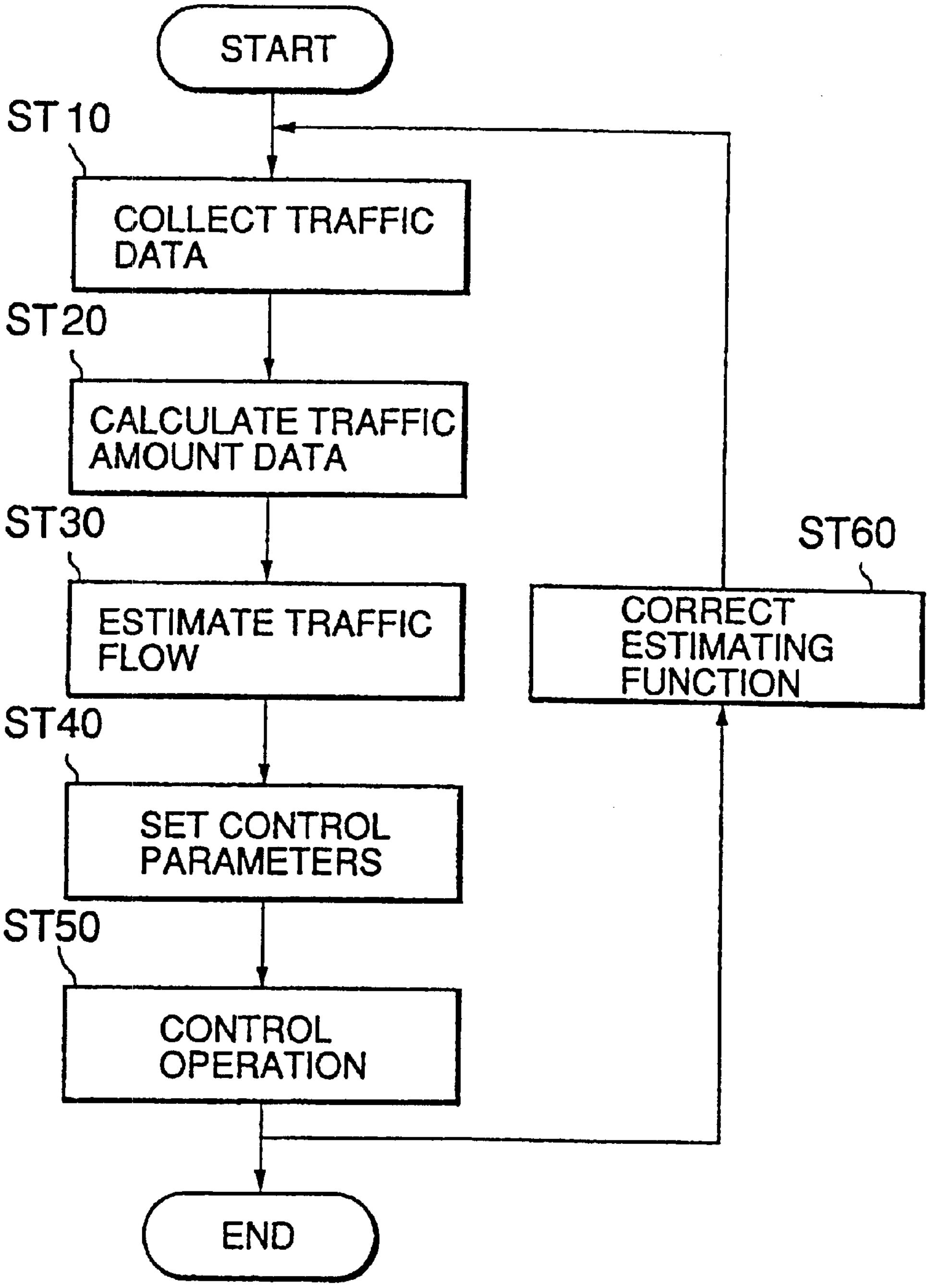
FIG. 3 is a flow chart of the operation of an elevator operation management and control system according to the present invention.

FIG. 3 is a flowchart schematically showing the group management control.

At first, the traffic data collecting section 1A collects traffic data, such as the behavior of cars, stopping and running, number of persons who get in/get off the elevators, car calls, hall calls, and cars corresponding to calls, in real-time (Step ST10).

Next, the traffic amount calculating section 1B calculates traffic amount data G from the traffic data collected by the traffic data collecting section 1A (Step ST20). The calculation of the traffic amount data G may be realized by causing the traffic amount calculating section 1B to calculate the number of persons who get in/get off the cars in the past five minutes, periodically, or per minute, for example.

Figure 4:
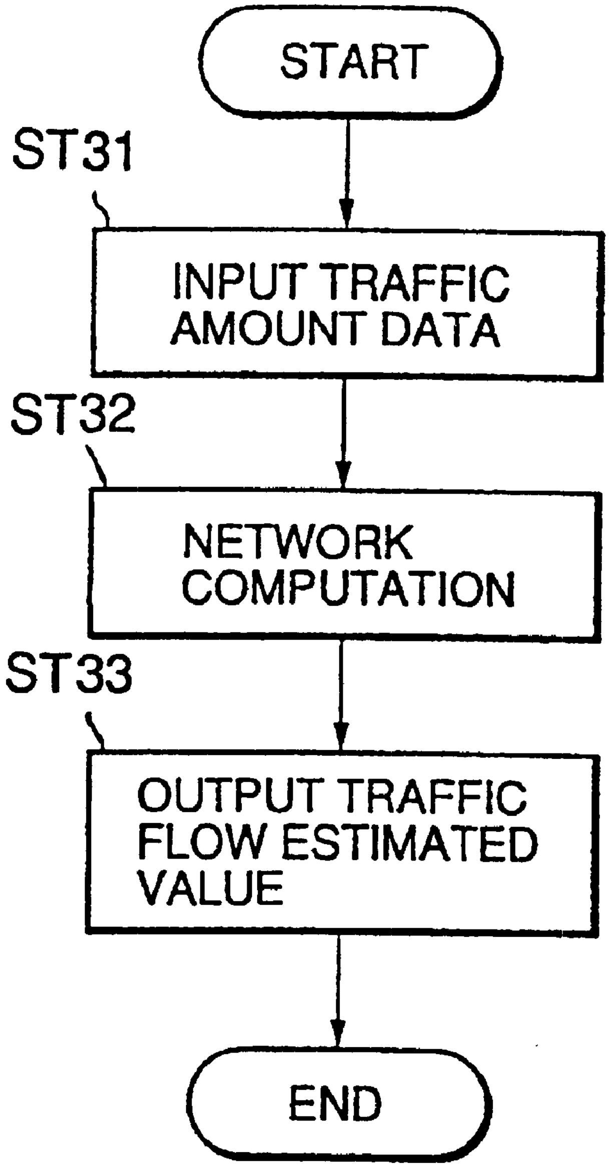
FIG. 4 is a flow chart of the operation of an elevator operation management and control system according to the present invention.

Next, the traffic flow estimating section 1C calculates the traffic flow estimated value from the traffic amount data G calculated by the traffic amount calculating section 1B in real-time (Step ST30). The traffic flow estimating operation in Step S30 will be explained by using FIG. 4.

The calculated traffic amount data G is input to the neural network 12 shown in FIG. 1 (Step ST31). At this time, values of the respective element data ON up(fl), ON dn(fl), OFF up(fl) and OFF dn(fl) of the traffic amount data G shown in the expression (2) are input to each neuron in an input layer of the neural network 12. Accordingly, the number of neurons in the input layer is 4×Z (Z is number of floors in the building).

The neural network 12 implements a known network computation (Step ST32) and outputs the traffic flow estimated value found by computation in real-time (Step ST33).

In this case, an output value of each neuron in an output layer of the neural network 12 is set as an estimated value of each element of the traffic flow data TF in the expression (4). That is, the estimated value of the traffic flow data may be obtained as OD data by setting the output value of the first neuron of the output layer as TF11, the output value of the second neuron as TF12, . . . . Accordingly, the number of neurons in the output layer is $Z^2$.

The number of neurons in the intermediate layer may be arbitrarily set corresponding to each case.

Further, the traffic flow data and traffic amount data may be described per zone by dividing the building into several zones. In such a case, Z is the number of zones.

Returning to the explanation of FIG. 3 again, the control parameter setting section 1F1 sets control parameters corresponding to the traffic flow data estimated by the neural network 12 when the traffic flow estimated data is obtained in real-time from the neural network 12 in Step ST30 (Step ST40).

Then, the operation control section 1G executes elevator group management control based on the control parameters set by the control parameter setting section 1F1 (Step ST50).

The function for estimating the traffic flow from data the traffic amount data realized by the neural network 12 during daily group management control may be constructed by repeatedly correcting the estimating function as described below.

That is, correction of the traffic flow estimating function realized by the neural network 12 is conducted periodically, for example, separately from daily group management control (Step ST60). The correction of the estimating function may be conducted after finishing daily control or at predetermined time intervals of one week, for example.

The correction of the estimating function may be realized by causing the neural network 12 to learn the relationship between a traffic flow and a traffic amount calculated from traffic flow data, and traffic amount data determined from traffic data obtained between the correction of the estimating function conducted immediately previously and the correction of the estimating function at the present time. The correction causes the neural network 12 to improve its traffic flow data estimating function as compared to the traffic flow estimating function obtained in a previous time.

The procedure for correcting the estimating function (Step ST60 of FIG. 3) will be explained by using FIG. 5.

Figure 5:
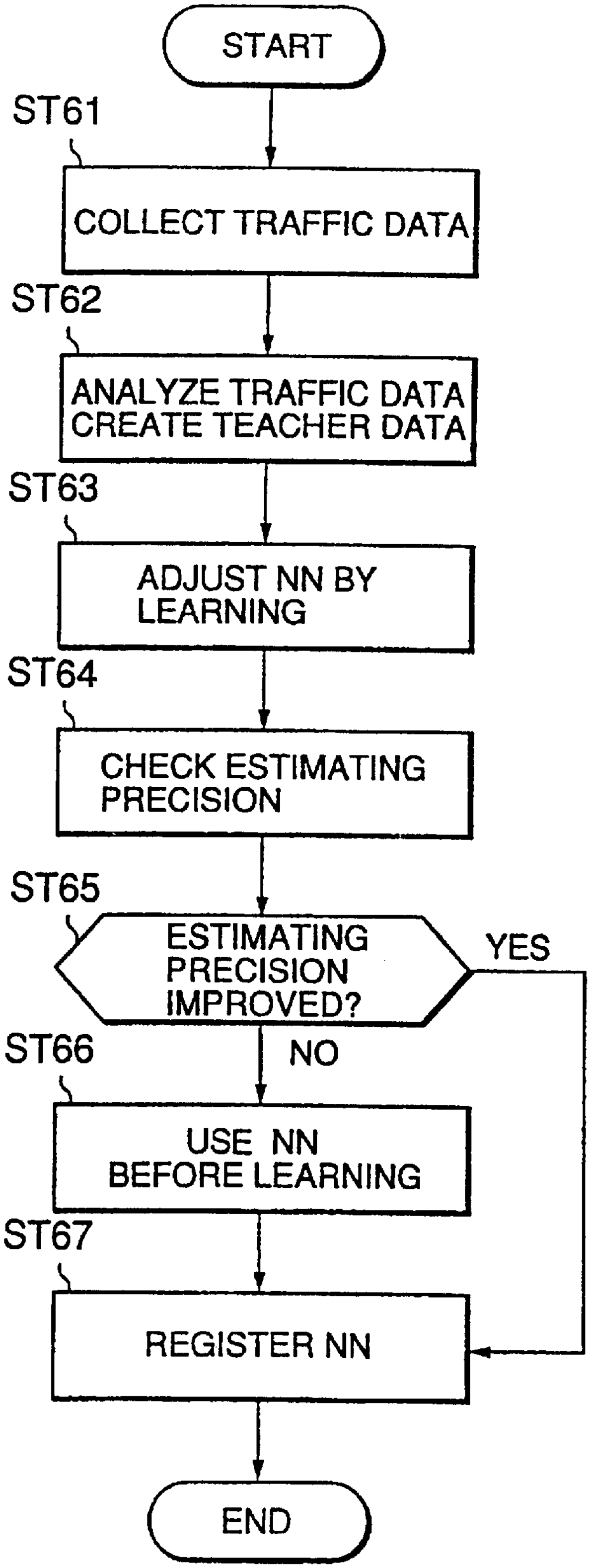
FIG. 5 is a flow chart of the operation of an elevator operation management and control system according to the present invention.

FIG. 5 is a flowchart showing the procedure for correcting the traffic flow data estimating function of the neural network.

Data stored for the correction of the estimating function in the traffic data and collected in Step ST10 is retrieved (Step ST61).

All of the collected data need not be stored as data for the correction of the estimating function. Predetermined data for about five minutes may be set as one unit and a predetermined number of data, e.g., several data per each time period, such as office departure hours and normal hours in which characteristic traffic flow occurs, may be stored for use in the correction of the estimating function.

Next, the teacher data creating section 1D analyzes the traffic data for correcting the estimating function, to create so-called teacher data, used in the learning by the neural network 12 (Step ST62).

The teacher data includes combinations of the traffic amount data and the traffic flow data respectively analyzed from the traffic data. The traffic amount data may be found in the form of the expression (5) from the number of persons who get in/get off each car, in the same manner as the procedure of the Step ST20 described above. The traffic flow data may be found in the form of the expression (4). The procedure for finding the traffic flow data will be explained further by using FIG. 6.

Figure 6:
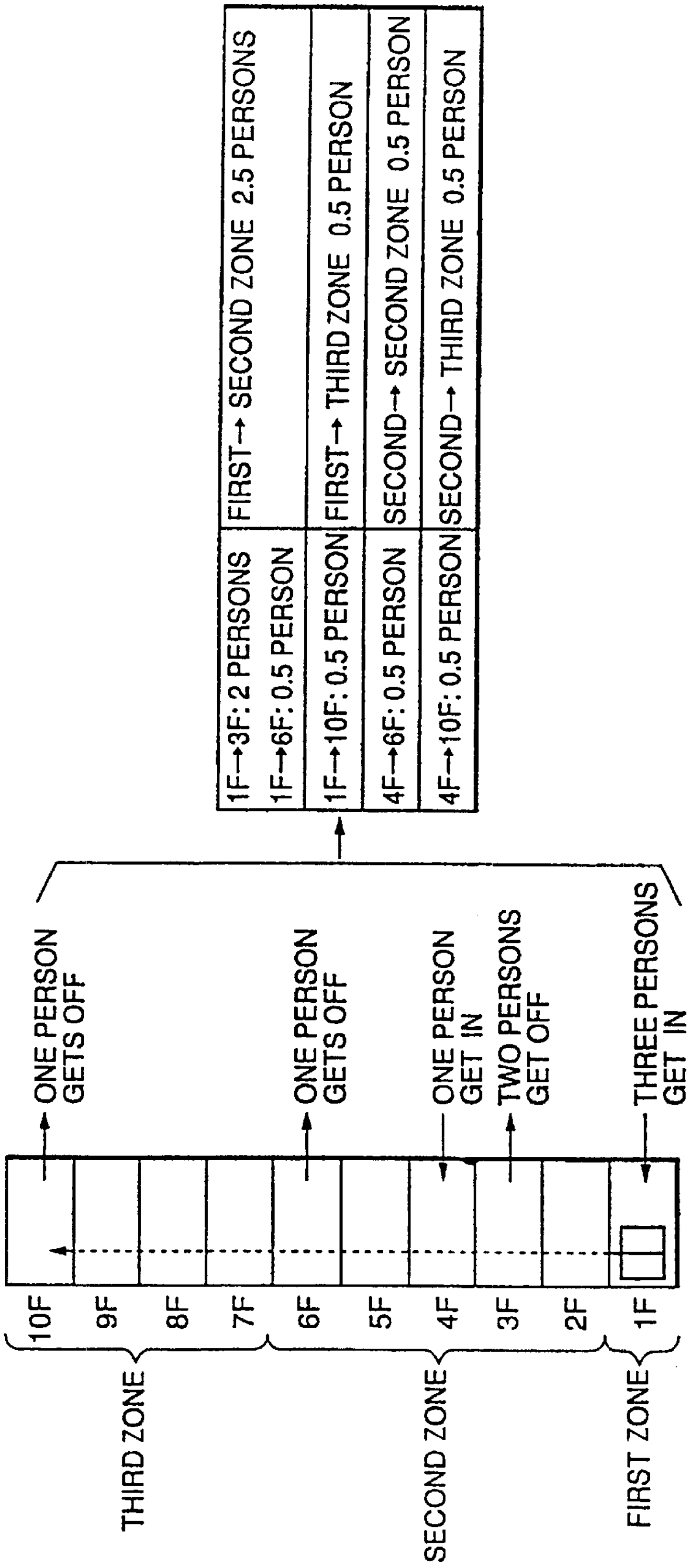
FIG. 6 is a diagram illustrating a feature of an elevator operation management and control system according to the present invention.
Figure 7:
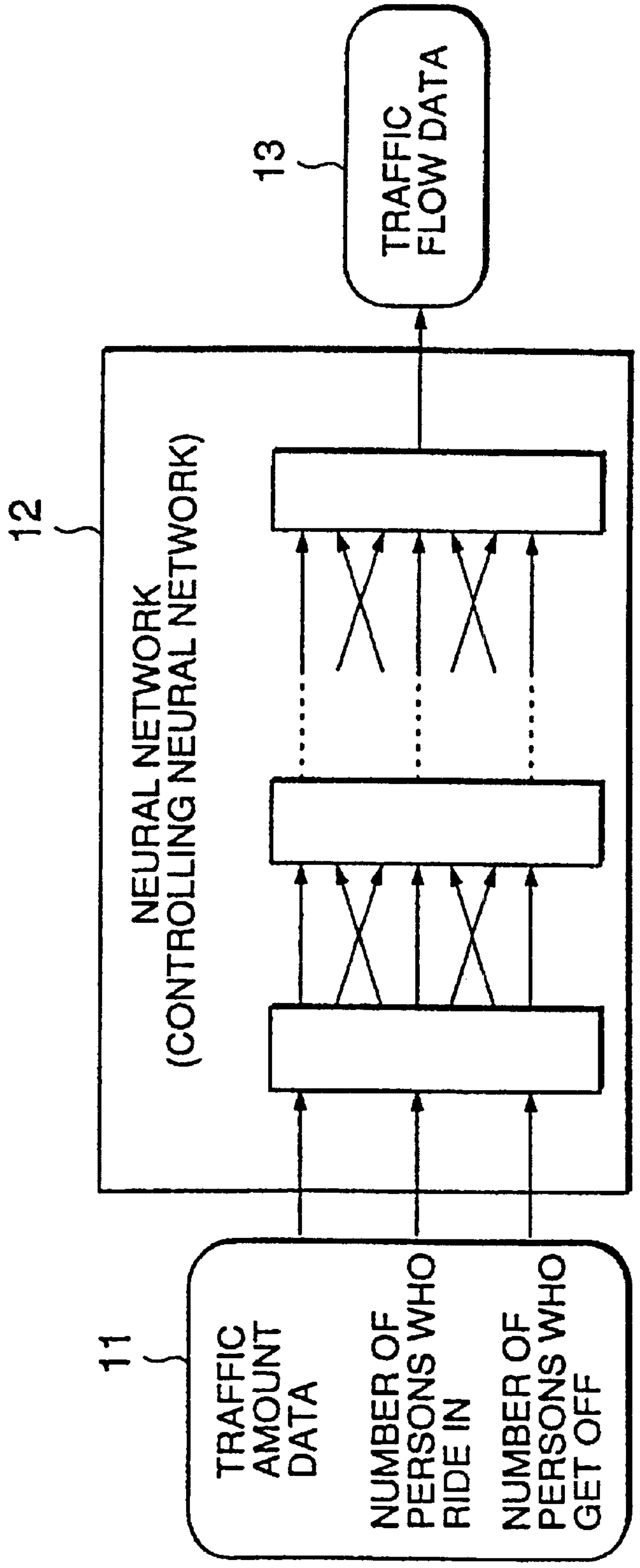
FIG.7 (PRIOR ART)
FIG. 7 is a schematic diagram of a prior art traffic control system.

A series of operations of a car, starting from a run in the UP direction or DOWN direction, until the car reverses its direction, is called a scan. For instance, assume that the stopping floors and number of persons who get in/get off a certain car in an UP scan in a target time period are 1F (three persons get in)→3F (two persons get off)→4F (one person gets in)→6F (one person gets off)→10F (one person gets off) as shown in FIG. 6.

In this case, the two persons who got off the car at 3F may be specified as persons who had gotten in at 1F. However, the entry floor of each of the elevator users who got off the car at 6F and 10F cannot be specified.

Accordingly, the number of elevator users who have gotten off and who cannot be specified as to entry floor is distributed equally into combinations of the movements of the elevator users. That is, in this case, two persons whose entry floor cannot be specified are distributed as 1F→6F (0.5 person), 4F→6F (0.5 person), 1F→10F (0.5 person) and 4F→10F (0.5 person).

Next, this data is converted per zone. When 1F is set as the first zone, 2F through 6F are set as the second zone, and 7F through 10F are set as the third zone in the example in FIG. 6, the traffic flow data as the OD (Origin/Destination) data may be expressed by the following expression (6):

TF 12=2.5 (1F→3F (2 persons) and 1F→6F (0.5 person)) TF 13=0.5 (1F→10F (0.5 person)) TF 22=0.5 (4F→6F (0.5 person)) TF 23=0.5 (4F→10F (0.5 person)) (6)

The traffic flow data in which information on the movements of an individual elevator user in the target time period is reflected may be found by calculating and integrating the above-mentioned data per each car and each scan.

Thus, the neural network 12 is caused to learn, adjusting the neural network 12 by using the combinations of the traffic amount data and the traffic flow data thus obtained, per stored traffic data, as the teacher data (Step ST63).

A so-called back propagation method, which is known well, is used for the learning of the neural network 12.

Next, the precision of the estimation of the traffic flow is checked. As an index of the estimation precision, a sum of squares of errors of respectively corresponding elements of the traffic flow data of the adopted teacher data and of the traffic flow estimated value, calculated by the neural network 12, based on the traffic amount data of the teacher data, is calculated (Step ST64).

That is, the errors E respectively found by using the following expression (7) concerning the teacher data are totaled, and the total value is an index of the estimation precision. It may be considered that the smaller the total value, the better the estimation precision is.

$$E=\Sigma(TFij-\underline{TF}ij)^2 \qquad (7)$$

TFij=value of each element of traffic flow data of teacher data $\underline{TF}$ij=value of each element of traffic flow estimated value calculated based on traffic amount data of teacher data.

Next, the estimating function constructing section 1E compares the total value of the errors E found by using the expression (7) in a current process with a total value of errors E found by using the expression (7) in a previous process for correcting the estimating function (Step ST65).

The estimating function constructing section 1E registers the neural network adjusted in Step S63 without change (Step ST67) when the estimation precision has been improved (YES in Step ST65). The estimating function constructing section 1E registers the neural network (Step ST67) by returning the neural network to the previous state (Step ST66) when the precision has not been improved (NO in Step ST65).

The neural network 12 and the traffic flow estimating section 1C may be held always in an adequate state and the precision for estimating the traffic flow may be sufficiently maintained by correction of the traffic flow estimating function, in addition to the normal group management control.

Therefore, the embodiment described above eliminates the need for preparing and storing combinations of a large number of traffic flow patterns and traffic amounts obtained from the traffic flow patterns in advance. The embodiment calculates the traffic flow estimated value immediately from the traffic amount data observed and can establish the elevator group management control by setting the control parameters for the group management control to correspond to the calculated traffic flow estimated value.

Further, because the input data contains no estimated value and is the traffic amount immediately observed, it becomes possible to calculate with high precision and to estimate the traffic flow more accurately. Further, the present embodiment is arranged to create the relationship between traffic amount data and traffic flow data through the neural network and to construct and correct the estimating function of the neural network by learning analytical results of the traffic data. Therefore, the embodiment eliminates the need for establishing a relationship of both the traffic data amount and the traffic flow amount, which requires enormous computing power and storing of a large amount of data in advance. The embodiment can reduce program and storage capacity necessary for the computation for associating the traffic data amount and the traffic flow amount.

Further, the estimation precision of the traffic flow estimated value estimated by the traffic flow estimating section is maintained, based on the actual traffic amount data and traffic flow data obtained in the interval between a previous adjustment of the estimation precision until a current adjustment of the estimation precision. Therefore, the present embodiment allows the elevator operation management and control system to conform to change in movements of elevator users, which depend on building and on time period, to be determined per building, for example.

Further, there is no risk that the estimating function constructing section will degrade the estimation precision by learning non-stationary traffic flow data, for the calculation of the index of the estimation precision of the traffic flow estimating section, as teacher data.

The present embodiment adjusts the neural network using teacher data to estimate a traffic flow corresponding to a time period per predetermined time period, so that the traffic flow is estimated more accurately, corresponding to a time period, rather than using a computing section which estimates traffic flow uniformly, regardless of the time period.

Further, because the traffic flow calculating section calculates the traffic flow estimated value as a rate of the elevator users who move between target floors, accounting for the whole traffic amount, the movement of the elevator users within the building may be expressed precisely.

Further, the present embodiment is not only beneficial in controlling operational management of one elevator but also allows complicated elevator operational management adapting to management control, conducting optimum operation control, by allotting calls to a plurality of elevators.

INDUSTRIAL APPLICABILITY

As described above, the inventive elevator operation management and control system may be suitably used.

What is claimed is:

1. An elevator operation management and control system controlling elevators and comprising:

a traffic data collecting section for collecting traffic data concerning elevator users of at least one elevator;

a traffic amount data calculating section, responsive to said traffic data collecting section, for calculating traffic amount data from the traffic data collected by said traffic data collecting section, the traffic amount data designating number of the elevator users in the at least one elevator at each floor and traveling in each direction at each floor;

a traffic flow estimating section, responsive to said traffic amount data calculating section, for calculating an estimated traffic flow of elevator users who move between respective floors via the at least one elevator, based on the traffic amount data calculated by said traffic amount data calculating section, said traffic flow estimating section including a neural network having an input side to which the traffic amount data is supplied and an output side at which the estimated traffic flow is obtained;

a control parameter setting section, responsive to said traffic amount data calculating section and said traffic flow estimating section, for setting control parameters for controlling operation of the at least one elevator, based on the estimated traffic flow and the traffic amount data;

an operation control section, responsive to said control parameter setting section, for controlling operation of the at least one elevator, based on the control parameter setting section;

a teacher data creating section for creating teacher data for learning by said neural network, based on the traffic amount data and traffic flow data, wherein the traffic flow data is determined for each movement of the at least one elevator for each direction of movement, without reversing the direction of movement of the at least one elevator, by counting, for each floor at which the at least one elevator stops, each movement of elevator users between pairs of floors that can be determined, and by equally distributing elevator user movements to pairs of floors at which the at least one elevator stops for movements of elevator users between particular pairs of floors cannot be determined; and an estimating function constructing section, responsive to said teacher data creating section, for constructing a function for calculation of the estimated traffic flow by said traffic flow estimating section, the function being supplied to said traffic flow estimating section, for the learning by said neural network, based on the teacher data created by said teacher data creating section.

2. The elevator operation management and control system as recited in claim 1, wherein said estimating function constructing section constructs a function based on a sum of squares of errors of respective elements of the traffic flow data of the teacher data and the estimated traffic flow calculated by said traffic flow estimating section, based on the traffic amount data, as an index of precision of the estimated traffic flow.

3. The elevator operation management and control system as recited in claim 2, wherein said teacher data creating section creates the teacher data based on the traffic data collected by said traffic data collecting section in a time period.

4. The elevator operation management and control system as recited in claim 2, wherein said traffic flow estimating section calculates the estimated traffic flow as a rate of traffic of elevator users who move between target floors.

5. The elevator operation management and control system as recited in claim 3, wherein said traffic flow calculating section calculates the estimated traffic flow as a rate of traffic of elevator users who move between target floors.

6. The elevator operation management and control system as recited in claim 1, wherein said teacher data creating section creates the teacher data based on the traffic data collected by said traffic data collecting section in a time period.

7. The elevator operation management and control system as recited in claim 6, wherein said traffic flow calculating section calculates the estimated traffic flow as a rate of traffic of elevator users who move between target floors.

8. The elevator operation management and control system as recited in claim 1, wherein said traffic flow estimating section calculates the estimated traffic flow as a rate of traffic of elevator users who move between target floors.

9. The elevator operation and control system as recited in claim 1 wherein said operation control section implements operation control as group management control.

* * * * *